March 9, 1971  R. S. WALTON  3,568,430

RESISTANCE BRIDGE CONTROLLED TIMEKEEPING DEVICE

Filed July 11, 1968

INVENTOR
RICHARD S. WALTON

BY LeBlanc & Shur

ATTORNEYS

United States Patent Office 3,568,430
Patented Mar. 9, 1971

3,568,430
RESISTANCE BRIDGE CONTROLLED TIMEKEEPING DEVICE
Richard S. Walton, Lancaster, Pa., assignor to Hamilton Watch Company, Lancaster, Pa.
Filed July 11, 1968, Ser. No. 744,201
Int. Cl. G04c 3/00
U.S. Cl. 58—23
18 Claims

ABSTRACT OF THE DISCLOSURE

There is disclosed herein an electronic timekeeping device employing a passive circuit element as a master frequency reference, comprising a motor driven gear train and hands and a feedback control circuit for the motor including a speed transducer, and an error detection circuit including a resistance bridge and a differential amplifier. The amplifier output operates a control circuit which provides adjustable excitation for the motor to maintain the desired operating speed. An ultra high precision resistor with an extremely small resistance-temperature coefficient, is employed in the resistance bridge circuit as the master frequency reference.

---

Figure 1:
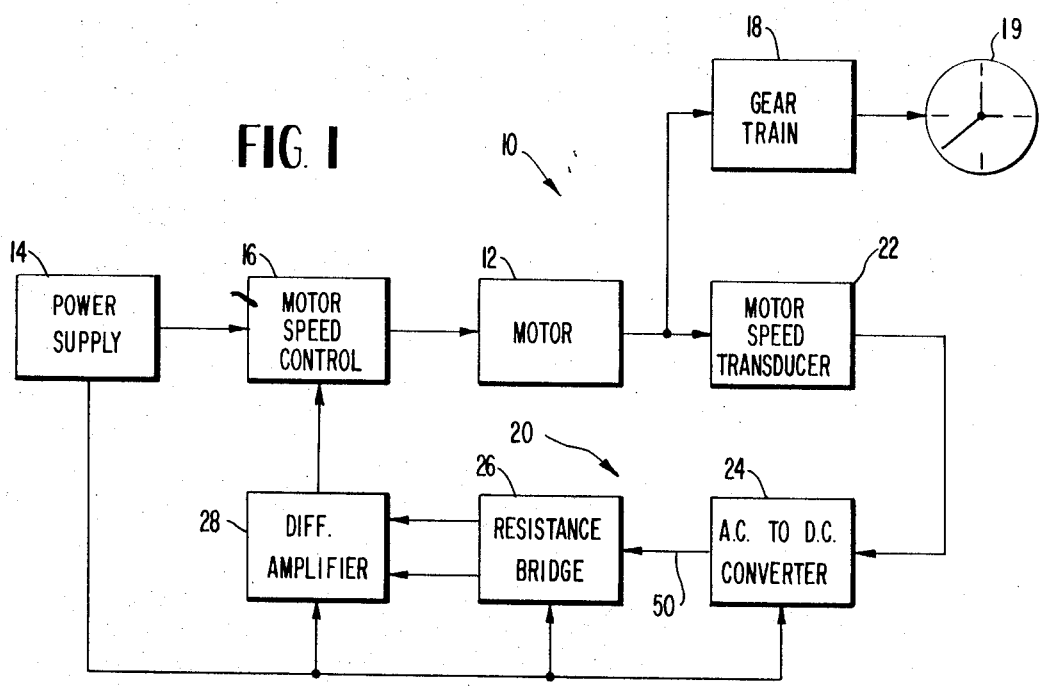

The present invention relates to electronic timekeeping devices, and more particularly to an electronic timekeeping device employing a passive circuit element as a master frequency standard to regulate the speed of operation. The concepts disclosed herein are particularly adapted for use in electronic wrist watches or the like where compact construction and low power supply demands are essential.

Battery powered wrist watches and other small portable timekeeping devices of various types are well known and are commercially available. One such device, which has proven to be quite successful commercially is shown and described in assignee's U.S. Reissue Pat. No. 26,187, reissued Apr. 4, 1967 to John A. Van Horn et al. for "Electric Watch." Such a device, generally denoted as an electric watch, employs a balance wheel and hairspring driven by the interaction of a current carrying coil and a magnetic field produced by small permanent magnets. Other types of mechanically regulated battery operated wrist watches are also known.

Considerable effort has also been directed toward the development of extremely high accuracy wrist watches which do not employ mechanical oscillators as the master speed reference. Among the approaches which have been taken, are use of purely electronic oscillators and frequency dividers to provide drive signals through an energy converter to a time display, e.g., through a conventional gear train and watch hands. For such an arrangement, an important factor in achieving accurate operation is good frequency control for the oscillator. Aside from long-term parameter variation in the circuitry, the most significant factor is shorter-term variation of circuit element parameters as a function of temperature. Elimination of oscillator frequency drift with temperature variations is especially important. Where miniaturization is not a factor, frequency control is often achieved by thermal isolation of the oscillator circuit. Alternatively, suitable temperature compensation techniques utilizing known circuit parameter variations as a function of temperature may be employed.

Various practical difficulties, including high power consumption, difficulty in miniaturization, etc. has stimulated pursuit of other alternatives in the design of highly accurate electronic wrist watches.

In this regard, it has been suggested that a feedback circuit be employed to maintain the proper frequency of operation for the reference oscillator. Such an arrangement may be satisfactory but may increase power consumption and circuit size and complexity.

As another approach, it has been suggested to dispense entirely with the reference oscillator and to provide a frequency discriminator directly responsive to the speed of the watch in a speed control feedback circuit. This approach has considerable merit since it is an inherently simple circuit with potential high accuracy. Unfortunately, no practical realization of an electronic timekeeping device employing this concept has heretofore been made available. Some difficulties which have been encountered in this area are high power requirements, and difficulty in achieving ultra high accuracy due to parameter variations with temperature, etc.

The present invention provides an electric timekeeping device suitable for use as a wrist watch which employs a battery driven motor and a motor speed control feedback circuit. The latter includes a motor speed sensor and associated circuitry to provide a DC signal representative of the operating speed to of motor. The motor speed signal is coupled to one arm of a bridge resistance circuit which includes, in another arm, a precision resistive element having extremely good temperature stability. This serves as the frequency standard for the timekeeping device. When the motor speed is not at the desired value, an unbalance signal from the bridge circuit is coupled through a difference amplifier to a motor speed control circuit which operates to adjustably excite the wrist watch motor. In this way, motor speed may be modified in response to bridge unbalance.

The critical frequency determining portion of the circuit is a single passive element and is inherently capable of providing the extremely high accuracy desired for the electronic timekeeping device. The resulting circuit is simple and more compact and can produce excellent long-term accuracy with freedom from variations in operating speed due to temperature changes.

Accordingly, it is a basic object of this invention to provide an improved electronic timekeeping device.

It is a further object of this invention to provide an electronic timekeeping device suitable for use as a wrist watch in which a passive, non-oscillatory circuit element provides the master frequency standard, thereby obviating the need for a reference time base oscillator.

It is a further object of this invention to provide a battery operated wrist watch having a motor driven time display and a feedback speed control circuit for the motor including a passive circuit element as a primary frequency reference.

It is a related object of this invention to provide a battery operated wrist watch having a feedback speed control circuit including a resistive bridge circuit having a variable resistance in one arm controlled by a signal representative of the motor speed, and having a passive resistance element with extremely high temperature stability in another arm as the primary frequency standard.

It is also an object of this invention to provide a timekeeping device having a speed control circuit including a speed transducer for generating a signal representative of the timekeeping rate and circuitry for comparing the rate signal with a standard signal produced by a passive resistive circuit element having a low thermal coefficient of resistance and a speed control circuit responsive to differences between the actual and desired timekeeping rates.

Figure 2:
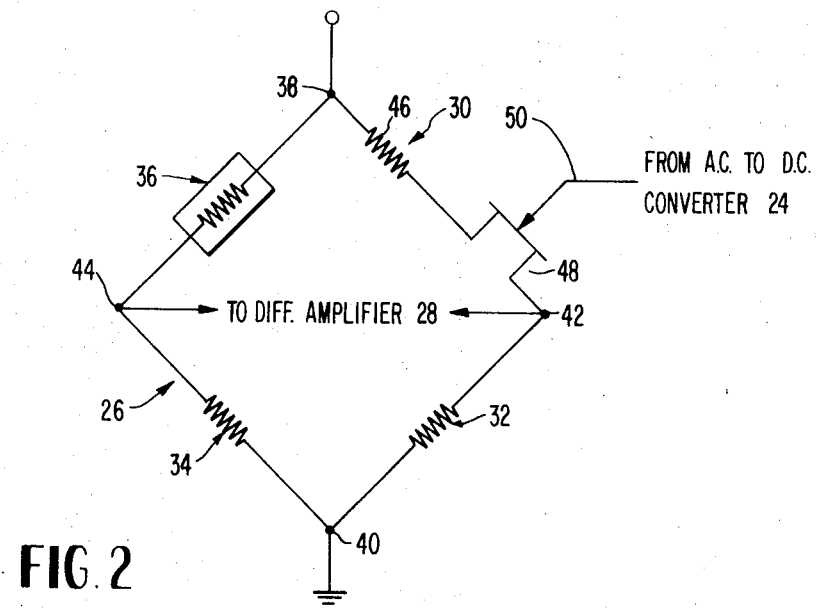

The exact nature of this invention, together with other objects and advantages thereof, will become apparent from consideration of the following detailed description and the accompanying drawing in which:

FIG. 1 is an overall electro-mechanical block diagram of a battery operated electronic time piece in accordance with this invention; and FIG. 2 is a schematic diagram showing a suitable circuit for the resistance bridge circuit included in the system of FIG. 1.

With reference now to the drawing, an electronic timepiece in accordance with this invention is generally denoted at 10 in FIG. 1. The circuit includes an electromechanical energy converter such as DC motor 12 adapted to be excited from a power supply 14 through a motor speed control circuit 16. Motor 12 may be of any suitable miniature type capable of variable speed energization, e.g., as a function of field or armature voltage. Power supply 14 is preferably a small dry cell battery of the type customarily employed in battery operated wrist watches.

Motor speed control circuit 16 may assume any convenient or desired form. For example, one suitable arrangement may employ a transistor circuit connecting power supply 14 and motor 12 through the transistor current path, or any other circuit configuration capable of providing variable motor excitation in response to an external control signal. Motor 12 is mechanically coupled as illustrated in FIG. 1 for example, a gear train 18 which operates a time display 19 including hour, minute and second hands, cooperating in conventional fashion to provide the time indication.

For the portion of the system described above, no provision is made for regulation of the speed of motor 12 and correspondingly, of timekeeping accuracy. In accordance with this invention, such control is provided by the feedback speed control circuit, generally denoted at 20 in FIG. 1. Feedback circuit 20 includes a motor speed transducer 22, and an electronic circuit portion including an AC to DC convertor 24, a resistance bridge 26, and a differential amplifier 28, the last named three circuits being operated, together with motor 12 and motor speed control 16 by power supply 14.

Motor speed transducer 22 serves to provide an electrical indication of the speed of motor 12. A variety of mechanical to electrical energy convertors can provide the desired speed indication; for example, an additional field winding on motor 12 may be employed to provide a time varying signal at a frequency and/or amplitude representative of the motor speed.

In order to provide a comparison of the actual and desired motor speeds in accordance with this invention, the output of motor speed transducer 22 is coupled through an AC to DC convertor 24 which converts the time varying signal into DC signal whose amplitude represents motor speed. A rectifier-filter circuit designed to match as closely as possible the temperature characteristics of resistance bridge circuit 26 described hereinafter may be employed for this purpose.

The actual construction of resistance bridge 26 is illustrated in FIG. 2. Four separate arms 30, 32, 34, and 36 are connected in series in a closed loop. A connection is made from power supply 14 to the junction 38 of bridge arms 30 and 36 and a ground connection is made at the junction 40 of arms 32 and 34. A pair of signal outputs to differential amplifier 28 are provided at the junctions 42 and 44 of branches 30 and 32 and 34 and 36, respectively.

Bridge arm 30 includes a fixed resistance 46 and a voltage controlled resistance element 48, preferably a field effect transistor. As illustrated in FIG. 2, the source-to-drain current path of field effect transistor 48 is connected in series with fixed resistor 46 and junction 42 while the gate input to transistor 48 is provided over a lead from AC to DC convertor 24.

Bridge arms 32 and 34 are preferably identical precision resistors carefully chosen and matched so that only the relationship between bridge arms 30 and 36 will affect the voltage input to differential amplifier 28. Also to conserve power resistors 32 and 34 should be quite large, e.g. at least about 1 megohm or more, thereby limiting total current drain from power supply 14.

As previously noted, bridge arm 36 constitutes the master frequency reference of the timekeeping device in accordance with this invention. This result is achieved by employing the bridge configuration shown since with bridge arms 32 and 34 identical, the input to differential amplifier 28 represents the difference between the currents, and hence the resistance in bridge arms 30 and 36.

Assume bridge arm 36 to be a fixed precision resistor whose value is constant and totally independent of any external or internal factors, such as ambient or operating temperature, etc. Then, changes in the value of the resistance in branch 30 will result in variation in the voltage between the output terminals 42 and 44. Such changes are produced by variation of the effective source-to-drain resistance of field effect transistor 48 in response to variation of the output of AC to DC converter 24. This, in turn, is dependent up on the output of motor speed transducer 22 and is therefore representative of the actual speed of motor 12.

In operation, motor 12 is set to run at approximately the desired speed for proper timekeeping by adjustment of motor speed control circuit 16, AC to DC convertor 24, resistance bridge 26, and differential amplifier 28. Motor speed control transducer 22 provides an AC signal related in frequency and amplitude to the motor speed. The transducer output signal is rectified and filtered by AC to DC convertor 24 and is provided to the gate terminal of field effect transistor 48 over lead 50. The value of resistor 46 in bridge arm 30 is so selected that the bridge is balanced with a zero voltage between junctions 42 and 44 when motor 12 is operating at the desired speed for accurate timekeeping. Any departures from the proper speed will cause a bridge unbalance and a non-zero voltage between junctions 42 and 44. The bridge output voltage is amplified by differential amplifier 28 and provided to motor speed control circuit 16. The latter is so adjusted that an input from differential amplifier 28 corresponding to a balanced condition of bridge 26 will maintain motor 12 operating at the correct speed for accurate timekeeping.

Should there occur a disturbance in the speed of motor 12, it will be reflected by a change in the frequency and/or amplitude of the output of motor speed transducer 22. This in turn causes a variation in the DC level of the output of AC-DC convertor 24, with consequent change in the bias on field effect transistor 48 and increase or decrease in the total resistance of bridge arm 30. Bridge 26 now becomes unbalanced and the bridge voltage is amplified by differential amplifier 28. This causes a change in the excitation for motor 12 to return its operating speed to the value which will rebalance bridge circuit 26.

The degree to which the above described feedback control circuit can maintain highly accurate timekeeping depends upon whether an unvarying frequency standard can be maintained both in the long run, and independent of transient variations of any type, e.g., changes in ambient temperature. For the present circuit, this requires a substantially constant value for reference resistor 36, independent of environmental variations, and most critically, substantially independent of temperature for the entire range of temperature variations to which the timepiece is likely to be subjected.

The possible operating temperature range may vary from as low as −50° F. to +150° F. (approximately −45° C. to about +65° C.). Substantial temperature variation over a substantial portion of this range can introduce major variations and inaccuracies in timekeeping accuracy. In order to overcome this, it is essential that frequency standard resistor 36 should exhibit exceptionally small resistance variations with temperature over the expected operating range. Thus, an extremely low thermal coefficient of resistance in frequency standard resistor 36 is necessary to achieve satisfactory operation. Best operation is achieved if the resistance-temperature coefficient does not exceed about ±1 part per million per degree centigrade (0.0001%) over the entire range of expected operating temperatures.

An additional factor of significance is long-term variation of the frequency standard. As may be appreciated, even small progressive variations of the characteristics of the frequency standard resistor 36 will result in long-term inaccuracies in timekeeping requiring continuing readjustment to maintain satisfactory accuracy. Thus, production of a commercially satisfactory product requires that any operational aging exhibited by frequency standard resistor 36 should take place during a short initial operating period and that the long-term resistance value be substantially constant thereafter. Under these circumstances, the circuit element can be subjected to an initial pre-production aging process during which the circuit element is subjected to current and operating temperature levels slightly exceeding the intended operating levels. Thereafter, the resistance value of element 36 will exhibit little or no long-term variation. In practice, the characteristics of resistance element 36 should be such that substantially all long-term instability takes place during the first two or three weeks of operation or less. Substantial long-term instability exceeding this may be unsatisfactory from a practical standpoint.

The foregoing requirements for satisfactory operation of frequency standard resistance 36 may be met by the use of so-called "flat wire resistors" formed of a bulk metal film photo-etched or otherwise reduced to the desired size and configuration without substantial mechanical working. One such device is the so-called Vishay resistor, produced by the Resistor Products Division of Vishay Instruments, Inc. of Malverne, Pa. The Vishay precision resistors are available in various standard sizes and resistance values with standard tolerances on the order of 0.01% with even higher tolerances available if desired. However, it should be understood that other equivalent high precision resistance elements exhibiting extremely low temperature-resistance variation and long-term operational stability may be substituted.

There has been described above an arrangement for providing highly accurate timekeeping operation without the need for a timebase provided by a reference oscillator. However, several variations in the circuit arrangement shown may be made without departure from the invention. For example, a wide variety of energy convertor-speed transducer combinations may be contemplated. Other alternatives, including substitution of a mechanical time display other than the conventional gear train and hands arrangement described or even of a non-mechanical, e.g., optical time display, are also contemplated. Numerous other variations will also be apparent to one skilled in the art in light of the foregoing description.

Thus, the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An electronic timekeeping device comprising: a visual time display; an electro-mechanical energy convertor to actuate said time display; speed control means for variably actuating said energy convertor to establish the rate of said timekeeping device; and feedback control means coupled between the output of said energy convertor and the input of said speed control means to regulate the rate of said timekeeping device, said feedback control means including a passive, highly temperature stable circuit element as a master frequency standard.

2. An electronic timekeeping device as defined in claim 1 wherein said feedback control means comprises means to produce a first signal representative of the operating rate of said electro-mechanical energy convertor; means to compare said first signal with a reference signal produced by said passive master frequency standard and to provide an error signal representative of the difference between said first signal and said reference signal; and means responsive to said error signal for operating said speed control means to adjust said electro-mechanical energy convertor in accordance with changes in said error signal to maintain accurate operation for said timekeeping device.

3. A timekeeping device as defined in claim 2 where said feedback control means includes a precision resistor as said passive circuit element; a field effect transistor having its drain to source resistance controlled by the value of said first signal; and means for providing said error signal as an indication of the difference between the voltage drops across said precision resistor and the drain to source current path of said field effect transistor.

4. An electronic time keeping device as defined in claim 1 wherein said feedback control means is comprised of sensing means coupled to said electromechanical energy converter for producing an electrical control signal representative of the operating rate of said converter, and a resistive bridge circuit including a first resistance element, the resistance value of which is dependent upon said electrical control signal; and a second precision resistance element having an extremely small resistance-temperature coefficient.

5. An electronic timekeeping device as defined in claim 4 wherein said sensing means comprises means for generating a DC signal representative of the rate of said electromechanical energy converter; and wherein the value of said first resistance element is determined by the level of said DC signal.

6. An electronic timekeeping device as defined in claim 4 wherein said precision resistance element constitutes the master frequency standard for said timekeeping device.

7. An electronic timekeeping device as defined in claim 1 wherein said electro-mechanical energy convertor comprises a variable speed motor; and wherein said speed control means comprises means responsive to the output of said feedback control means to vary the excitation of said motor, thereby providing adjustment of the motor speed.

8. An electronic timekeeping device as defined in claim 7 wherein said feedback control means includes a motor speed transducer for producing an AC signal representative of the operating speed of said motor; a resistance bridge circuit including a voltage variable resistance having a pair of signal terminals and a control terminal, the value of the resistance between said signal terminals depending upon an electrical signal appearing at said control terminal; means coupling said control terminal to the output of said transducer means; said resistance bridge circuit including a precision resistance element serving as the master frequency standard; means coupled to said voltage variable resistance and to said frequency standard resistance to provide a signal representative of the difference in the voltage drop across said resistance elements; and means coupling said difference signal to the control input of said motor speed control circuit.

9. An electronic timekeeping device as defined in claim 8 wherein said voltage variable resistance element comprises a field effect transistor having its drain to source current path connected in series with said frequency standard resistive element.

10. An electronic timekeeping device as defined in claim 1 wherein said feedback control circuit includes transducer means for producing a signal representative of the speed of said energy convertor; a comparison circuit including said master frequency standard coupled to said transducer for producing an error signal representative of the difference between the actual speed and the desired speed for accurate timekeeping; and means coupling said error signal to the control input of said speed control means.

11. An electronic timekeeping device as defined in claim 10 further including power supply means coupled to said feedback control means; said comparison circuit being comprised of a first branch including a resistance element having a pair of signal terminals and a control terminal, the value of the resistance between said signal terminals depending upon the output of said transducer means, a second branch including a precision resistance element having closely controlled electrical parameters and an extremely small resistance-temperature coefficient; third and fourth like resistance elements connected in a series loop with said first and second resistive elements; the junctions between said first and second branches and said third and fourth branches being connected to said power supply; the junction of said first and third branches and the junction of said second and fourth branches constituting the comparator output representing said error signal and being coupled to the control terminal of said speed control means.

12. An electronic timekeeping device as defined in claim 11 wherein the voltage controlled resistive element in said first branch is a field effect transistor.

13. A rate regulating mechanism for an electronic timekeeping device including a time display, and actuating means for said time display, said rate regulating mechanism comprising: sensing means coupled to said actuating means to produce an electrical signal, the amplitude of which is representative of the actual rate of said timekeeping device; a comparator circuit including passive circuit means comprising a D.C. master frequency standard for said timekeeping device and means for producing an error signal representative of the difference between the actual timekeeping rate and that represented by the master frequency standard; and means responsive to said error signal for adjusting said actuating means to reduce the error between the actual and desired timekeeping rate, thereby maintaining accurate timekeeping operation.

14. A rate regulating mechanism as defined in claim 13 wherein said comparator comprises a resistive bridge circuit including a first branch comprised of a circuit element having a pair of signal terminals and a control terminal, the value of the resistance between said signal terminals being determined by a signal applied to said control terminal; a second branch connected in series with said first branch and including a precision resistive element having an extremely small resistance-temperature coefficient; and third and fourth like resistive branches, said third branch connected in series between said first and fourth branches; said fourth branch being connected in series between said third branch and said second branch, the junction of said first and second branches and said third and fourth branches being adapted for connection to the power supply of said timekeeping device; and the junctions of said first and third and second and fourth branches providing said comparator output error signal; said control terminal of said circuit element in said first branch being connected to the output of said sensing means whereby the resistance value exhibited by said circuit element is determined by the value of the signal representative of the actual rate of said timekeeping device.

15. A rate regulating mechanism as defined in claim 13 wherein said comparator is a bridge circuit, the arms of said bridge being formed of essentially purely resistive elements.

16. A rate regulating mechanism as defined in claim 13 wherein said passive circuit means comprises a precision resistance element with an extremely small thermal coefficient of resistance.

17. A rate regulating mechanism as defined in claim 16 where said thermal coefficient of resistance does not exceed about ±1 part per million over the expected range of operating temperatures of said time piece.

18. A rate regulating mechanism as defined in claim 13 where said comparator includes a precision resistor as said passive circuit means; a field effect transistor having its drain to source resistance controlled by the value of the signal representative of the actual timekeeping rate; and means for providing said error signal as an indication of the difference between the voltage drops across said precision resistor and the drain to source current path of said field effect transistor.

References Cited

UNITED STATES PATENTS 3,225,536  12/1968  Reich _____ 58—28X
3,374,413  3/1968   Dornberger et al. _____ 318—318

RICHARD B. WILKINSON, Primary Examiner

E. C. SIMMONS, Assistant Examiner

U.S. Cl. X.R.

318—314